June 14, 1927.
T. H. LE FEVER
1,632,300
CRANKING DEVICE FOR AUTOMOBILES
Filed Sept. 20, 1926    2 Sheets-Sheet 1
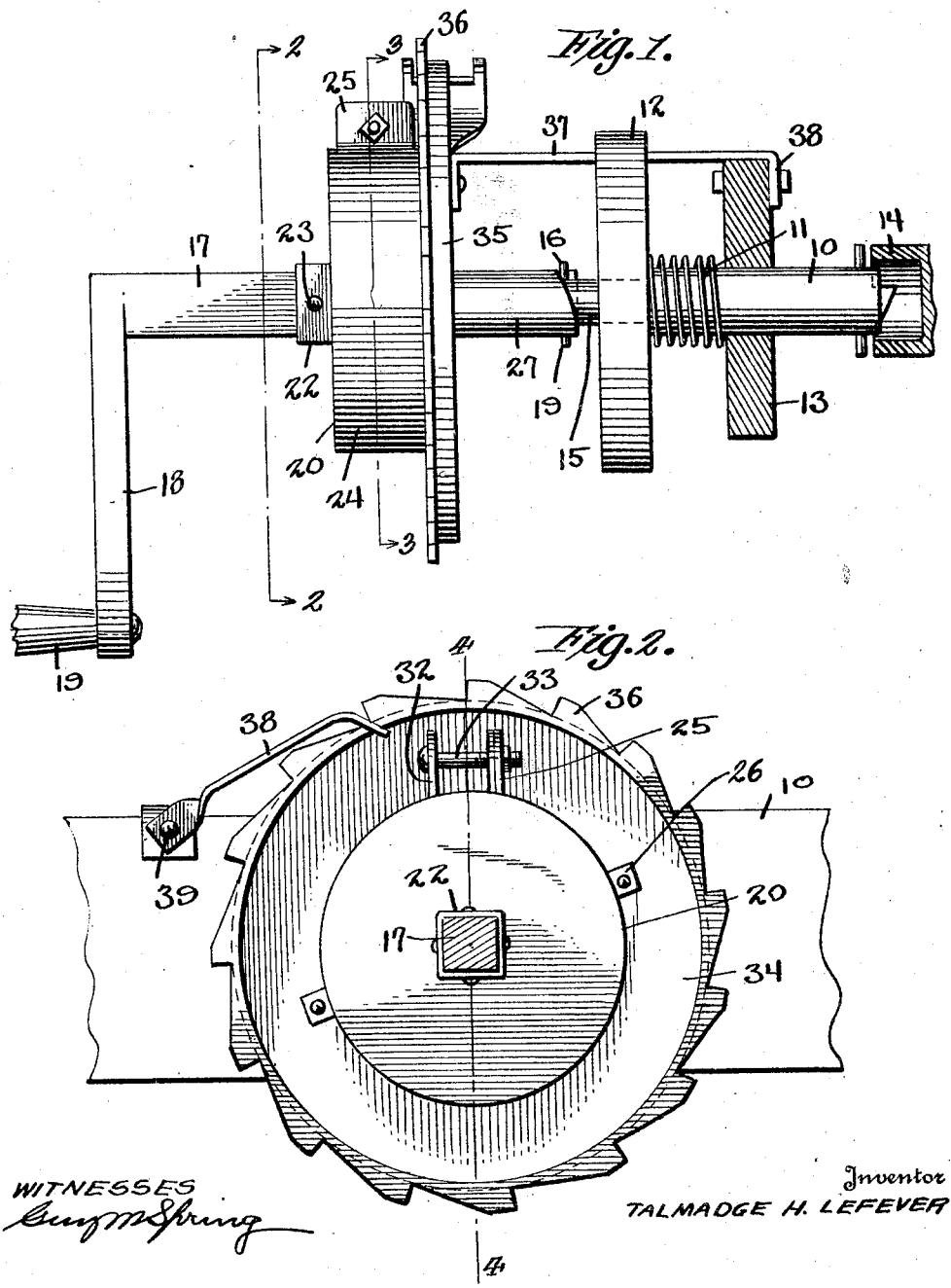
WITNESSES
Inventor
TALMADGE H. LEFEVER
By
Attorney June 14, 1927.
T. H. LE FEVER
1,632,300
CRANKING DEVICE FOR AUTOMOBILES
Filed Sept. 20, 1926  2 Sheets-Sheet 2
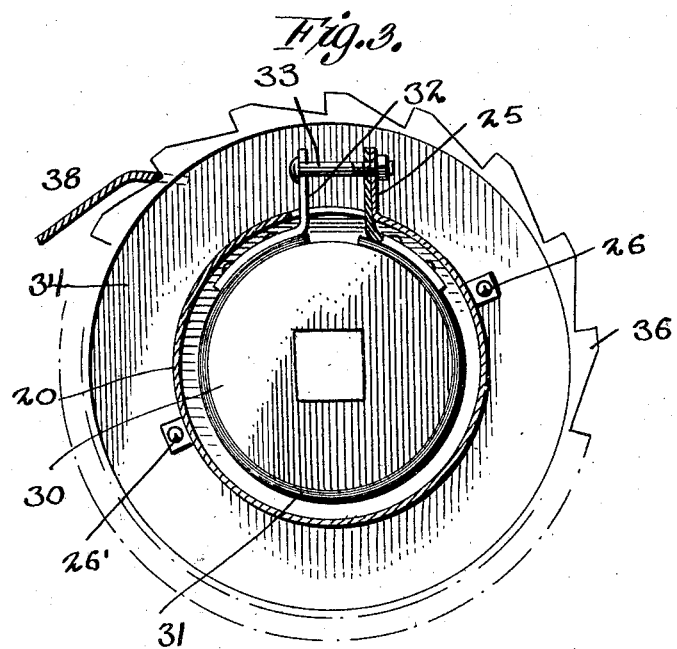
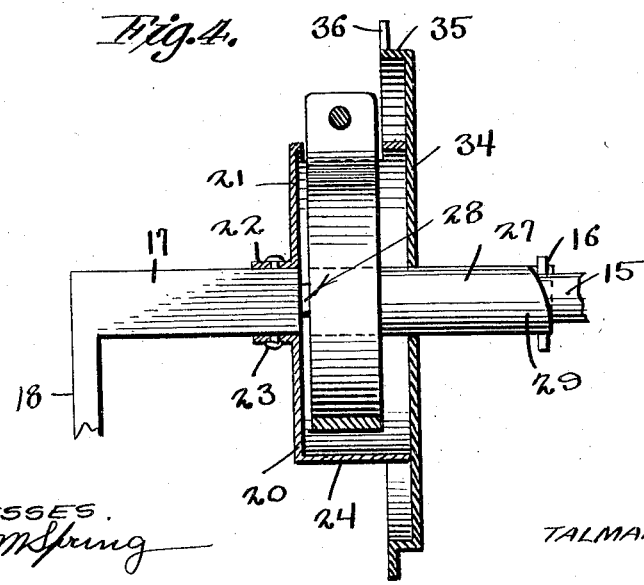
WITNESSES.
Inventor
TALMADGE H. LEFEVER
By Richard B. Owen.  Attorney Patented June 14, 1927.

1,632,300

UNITED STATES PATENT OFFICE.

TALMAGE H. LE FEVER, OF NEW BLOOMFIELD, MISSOURI.

CRANKING DEVICE FOR AUTOMOBILES.

Application filed September 20, 1926. Serial No. 136,676.

The present invention relates to improvement in cranking devices for automobiles, tractors and the like and has for its primary object to provide a cranking device which will prevent the back spin of the crank handle and possible injury to the operator.

A further object of the invention is the provision of a crank of the above character which can be conveniently installed upon the usual type of automobile without material alteration in the vehicle structure.

A still further object of the invention is the provision of a crank of the above type which will be simple and durable of construction and which can be manufactured and installed at a relatively small cost.

Other objects and advantages of the invention will become apparent as the decription progresses.

In the accompanying drawings forming a part of this application and in which like reference characters are employed to designate corresponding parts throughout the same;

Figure 1 is a side elevational view of my improved cranking apparatus shown in operative position in engagement with the crank of an automobile.

Figure 2 is a transverse sectional view taken on the line 2—2 of Figure 1,

Figure 3 is a similar view taken on the line 3—3 of Figure 1, and

Figure 4 is a longitudinal sectional view taken on the line 4—4 of Figure 2.

Referring to the drawings, wherein for the purpose of illustration is shown the preferred embodiment of my invention, the numeral 10 generally designates an auxiliary crank shaft sleeve commonly employed on standard makes of automobiles and trucks, a spring 11 being mounted thereon to normally urge the sleeve 10 forwardly. A fly wheel 12 is rigidly secured on the forward end of the sleeve 10, the sleeve being rotatably supported in a transverse frame beam 13. The inner or rear end of the sleeve 10 is arranged for detachable connection with the forward recessed portion 14 of the vehicle crank shaft. Secured to the forward end of the sleeve 10 and projecting forwardly of the fly wheel 12 is a cylindrical shaft extension 15, a pin 16 being mounted transversely through the shaft and projecting laterally at the sides thereof. This construction is standard equipment on many types of automobiles and is shown to illustrate the application of my improved cranking device in association therewith.

With particular reference to my invention, it will be noted that I provide a crank having a non-circular, preferably square, shank 17, and having a right angular crank formed on its forward outer end. A suitable handle 19 is secured to the outer extremity of the arm 18 in the customary manner. Firmly secured to the rear or inner end of the shank 17 is a cylindrical housing 20 embodying a circular housing plate 21 provided with a square outwardly projecting sleeve 22, this sleeve being snugly fitted on the inner end of the shank and secured thereon by means of screws 23 or in any suitable manner. Formed integral with the housing plate 21 and projecting outwardly is a cylindrical flange 24, radial outwardly projecting lugs 25 being struck from the flange 24 and apertured adjacent their outer ends. A plurality of radially projecting apertured ears 26 are formed on the free edge of the housing flange 24, the purpose of which will become apparent as the description progresses.

Arranged for rotatable engagement with shank 17 is a cylindrical auxiliary crank shaft 27 provided at its outer end with a reduced extension 28 adapted to be rotatably fitted in a circular recess formed in the rear end of the shank 17. The inner end of the auxiliary crank shaft 27 is provided with a circular bore adapted to be slidably fitted upon the shaft 15 of the motor and the inner edge is cut to provide a pair of cam shaped lugs 29 adapted to engage the transverse pin 16 mounted on the shaft 15 for simultaneous rotation of the shafts in one direction. The outer end of the shaft 27 is formed to provide a non-circular portion upon which is snugly fitted a circular comparatively wide disc 30 rigidly mounted on the shaft and adapted to rotate therewith. Positioned about the periphery of the disc 30 is a flexible band 31 preferably constructed of a brake lining material and having angular clips 32 rigidly secured adjacent its ends. These clips are formed with arcuate extensions adapted to conform to the curvature of the disc and rigidly or otherwise secured to the band. The clips are also formed to provide radially projecting arms apertured adjacent the outer ends for convenient engagement of a bolt 33. In this connection it will be readily noted that the lug 25 struck from the flange of the housing is positioned adjacent one of the clips and formed with an opening adapted to align with the opening of the clip arms. The bolt 33 is fitted through the openings in the clips and lug 25 and securely fastens the same together. It is readily apparent, that by rotary operation of the nut carried by the bolt 33 the tension of the band 31 upon the disc may be readily adjusted.

Slidably fitted upon the shaft 27 and arranged in a vertical position thereon is a comparatively large circular plate 34 having a circular central opening adapted to easily clear the shaft and formed with a laterally offset flange 35. The outer edge of the flange 35 is bent outwardly in a vertical plane and cut to form ratchet teeth 36. The plate 34 is provided with openings adapted to align with the apertured ears 26 and the plate is securely connected to the ears by means of transverse bolts 26'. Thus, the plate 34 is rigidly secured to the housing and movable with the crank, while the shaft 27 is rotatable with the plate subject to the tension of the band 31.

Firmly secured to the frame of the vehicle and projecting forwardly therefrom is a horizontal bracket arm 37, the ends being turned downwardly as at 38 for attachment with the transverse frame beam 13 and for attachment with a pivoted pawl 38 at its forward end.

The pawl is formed of a metallic bar bent at right angles at one end and apertured to receive a pivot pin 39 projected through an aperture in the forward end of the bracket arm permitting convenient swinging movement of the pawl. The free end of the pawl is bent downwardly at an acute angle and provided with a central slope adapted to engage the ratchet teeth 36 formed on the plate 34.

In use, my improved cranking device engages the crank shaft extension in the usual manner, the cam lugs 29 formed in the forward end of the shaft 27 engaging the transverse pin 16 to rotate the crank shaft and start the motor. If, when cranking the motor, the crank shaft is spun back the pawl 38 engages the ratchet teeth 36 and will prevent reverse movement of the plate 34 and operating crank, thus eliminating the possibility of the dangerous back spin of the crank. It will be noted, however, that the auxiliary shaft 27 may be rotated in reverse movement against the tension of the lining band 31 so as to avoid possible injury to the motor by the sudden check of the crank shaft. Thus, it will be seen that my improved cranking device positively obviates the back spin of the starting crank, although the crank shaft may be reversed subject to a frictional braking action imparted to the disc 30 by the flexible band 31. By adjustment of the bolt 33, the tension of the brake band 31 may be regulated to permit greater or less movement of the auxiliary shaft 27. It is essential that the band 31 be tightened sufficiently to permit rotation of the engine crank shaft although any movement of the crank shaft in excess of the customary rotary action required to turn over the motor will be imparted to the auxiliary shaft subject to the tension of the lining band. This construction provides a simple and effective cranking device which will greatly minimize the danger incident to the starting of the motor by a hand crank.

It is to be understood that the form of my invention herewith shown and described is to be taken as the preferred example of the same, and that various changes as to the shape, size and arrangement of parts may be resorted to without departing from the spirit of the invention or the scope of the subjoined claims.

Having thus described my invention, I claim:

1. A cranking device comprising a hand crank, a ratchet wheel connected with the crank, an auxiliary crank shaft rotatably associated with the crank, a disk secured to the auxiliary crank shaft, a brake band positioned about the disk and associated with the ratchet wheel, and a pawl engageable with the ratchet wheel adapted to permit cranking movement of the crank and prevent reverse rotary movement thereof.

2. A cranking device comprising a hand crank, a housing secured to the hand crank, a circular plate secured to the housing provided with ratchet teeth at the outer periphery, an auxiliary crank shaft rotatably associated with the crank, a disc secured on the inner end of the auxiliary crank shaft and positioned in the housing, a brake band positioned about the shaft and engageable with the housing, and a pawl engageable with the ratchet teeth adapted to permit cranking movement of the crank and to prevent reverse rotary movement thereof.

3. A cranking device comprising a hand crank including a shank, a housing secured upon the inner end of the shank, a circular plate secured to the inner end of the housing and provided with ratchet teeth at its outer periphery, an auxiliary crank shaft rotatably associated with the main crank shank, a disc secured upon the outer end of the auxiliary shaft and movable in the housing, a flexible brake band disposed about the periphery of the disc and having clip members secured thereto, the said clip members secured to an opening in the housing and movable therewith, the said auxiliary shaft being movable with the crank shaft during the cranking operation and in reverse movement subject to the action of the brake and a pivoted pawl engageable with and a pawl supported on a bracket arm normally engageable with the ratchet teeth adapted to prevent reverse rotary movement of the crank.

5. A cranking device comprising an angular hand crank, a cylindrical casing secured upon the hand crank having an opening formed in its periphery, a ratchet plate secured to the inner end of the housing and having ratchet teeth formed on its outer periphery, an auxiliary crank rotatably associated with the hand crank, a disc fixed upon the outer end of the auxiliary crank and disposed within the housing, a flexible brake band positioned above the periphery of the disc having angular clip members secured thereto arranged to permit adjustment of the band and projecting through the opening in the housing, the said clip members being secured to the housing and movable therewith, and a pivoted pawl supported upon a rigid bracket arm normally engageable with the ratchet teeth to permit operative movement of the crank and prevent reverse rotary movement thereof.

5. A cranking device comprising an angular hand crank, a cylindrical casing rigidly secured to the shank of the crank having an opening formed in its peripheral portion and a lug formed thereon, a ratchet plate rigidly secured to the inner end of the housing, ratchet teeth formed in the periphery of the said ratchet plate, an auxiliary shaft rotatably associated with the crank having one end formed for engagement with the crank of an engine, a disc rigidly secured upon the outer opposite end of the auxiliary shaft and disposed within the housing, a flexible brake band positioned above the periphery of the disc, a pair of clips secured to the ends of the band and projecting through the opening in the housing, one of said clips being secured to the lug formed on the housing, means for adjusting the tension of the brake band upon the disc, and a pivoted pawl supported on a rigid bracket normally engageable with the ratchet teeth to permit operative rotary movement of the crank but prevent reversible rotary movement thereof.

In testimony whereof I affix my signature.

TALMAGE H. LE FEVER.